| United States Patent [19] | [11] | 4,100,223 |
|---|---|---|
| Meyer et al. | [45] | Jul. 11, 1978 |

[54] PROCESS FOR THE PRODUCTION OF HIGH-IMPACT THERMOPLASTIC MOULDING COMPOSITIONS

[75] Inventors: Rolf-Volker Meyer; Rolf Dhein, both of Krefeld, Germany

[73] Assignee: Bayer Aktiengesellschaft, Germany

[21] Appl. No.: 777,716

[22] Filed: Mar. 15, 1977

[30] Foreign Application Priority Data

Mar. 20, 1976 [DE] Fed. Rep. of Germany ....... 2612011

[51] Int. Cl.$^2$ ............................................. C08L 77/00
[52] U.S. Cl. ........................ 260/857 L; 260/857 UN
[58] Field of Search ..................... 260/857 L, 857 UN

[56] References Cited

U.S. PATENT DOCUMENTS

| 3,373,222 | 3/1968 | Armstrong | 260/857 L |
| 3,373,223 | 3/1968 | Armstrong | 260/857 L |
| 3,373,224 | 3/1968 | Mesrobian | 260/857 L |
| 3,822,227 | 7/1974 | Hermann | 260/857 L |
| 3,974,234 | 8/1976 | Brinkmann | 260/857 L |
| 4,035,436 | 7/1977 | Matsubara | 260/857 L |

FOREIGN PATENT DOCUMENTS

| 46-38023 | 2/1967 | Japan | 260/857 L |

*Primary Examiner*—Paul Lieberman
*Attorney, Agent, or Firm*—Connolly and Hutz

[57] ABSTRACT

A moulding composition consisting of:
from 60 to 93 parts, by weight, of a polyamide;
from 6 to 30 parts, by weight, of a polyethylene; and
from 1 to 20 parts, by weight, of a copolymer of an aromatic vinyl compound, an α, β-unsaturated mono- and/or di-carboxylic acid or an anhydride thereof, free acid groups optionally being neutralized by a mono- and/or poly-amine or with ammonia, and an ester of the said mono- and or di-carboxylic acid.

14 Claims, No Drawings

PROCESS FOR THE PRODUCTION OF HIGH-IMPACT THERMOPLASTIC MOULDING COMPOSITIONS

This invention relates to polyamide-based polymer mixtures having high impact strength.

The impact strength of mouldings produced from polyamide plastics is governed to a considerable extent by the water content of the mouldings. In water-free form, for example after the production of the mouldings by injection moulding, it is particularly the mouldings produced from free-flowing polyamide injection moulding compositions of medium molecular weight, more especially mouldings produced from highly crystalline polyamides, that are relatively sensitive to impact. Accordingly, there is a need for quickly processible free-flowing polyamide plastics which can be processed into mouldings of increased impact strength in dry form. Polyamides having high tensile strength, high thermal stability under load, high resistance to solvents and ready processibility, combined with high impact strength and flexibility, are of particular interest.

There are already various processes for increasing the strength and flexibility of polyamides including, for example, mixing low molecular weight plasticisers into polyamides. Unfortunately, this approach does not satisfactorily solve the problem for a number of reasons. Most of the plasticisers suitable for plastics are not sufficiently compatible with polyamides and either disintegrate during processing or show a tendency towards exudation. Unfortunately, compatible plasticisers which form genuine solutions with polyamides generally have an adverse effect upon the mechanical properties of the polyamides. Although strongly polar substances of low molecular weight, such as water or dimethyl formamide, have a strong plasticising effect, they should be worked into polyamide mouldings only after the production of the mouldings because the processing of correspondingly pretreated polyamide granulate would result in the formation of bubble-containing mouldings on account of the relatively low boiling points of these plasticisers.

In addition, this process is generally time-consuming and expensive and is not suitable for the production of thick-walled mouldings because of the irregular distribution of the plasticiser in the moulding.

Moreover, these plasticisers escape from the polyamide to a considerable extent on account of their relatively high vapour pressure.

According to other processes, the impact strength of polyamides is improved by the addition of polymeric substances, such as polyethylene and copolymers of vinyl acetate and ethylene. The production of such mixtures involves extremely intensive kneading. Nevertheless, disintegration occurs during further processing, for example by injection moulding. Mouldings produced from mixtures of the type in question show pronounced white fracture under stress. In another process, the flexibility of polyamides is increased by mixing in polyethylenes containing acid groups, such as copolymers of ethylene and unsaturated acids or polyethylene grafted with unsaturated acids. Although mixtures of this type are more finely disperse and show far less white fracture under stress than the mixtures described above, they have considerably poorer mechanical properties, such as E-modulus, tensile strength, hardness and rigidity, than unmixed polyamide moulding compositions, in spite of the slight improvement in strength and flexibility. In addition, the polyethylene components containing acid groups are not as readily accessible as polyolefins containing neutral groups.

In another known process, therefore, copolymers of ethylene and esters of (meth)acrylic acid with tertiary alcohols are used for increasing the flexibility of polyamides.

On account of their unfavourable r-values, however, these particular copolymers can only be produced by elaborate polymerisation processes. Because of their poor thermal stability that is necessary, when preparing the mixtures with polyamides, to use extruders with vents for removing the olefins liberated under the reaction conditions.

Accordingly, despite the numerous efforts that have been made, it has not yet been possible to produce polyamide moulding compositions from readily accessible components which show improved flexibility and strength in comparison to non-modified polyamides.

It has now surprisingly been found that high-impact thermoplastic moulding compositions without any of the disadvantages referred to above can be obtained from polyamides and olefin polymers, by combining polyamides with polyethylenes, in the presence of small quantities of a third component having an emulsifying effect based on a readily accessible copolymer containing polar groups, such as an acrylic resin.

Accordingly, the present invention relates to high-impact thermoplastic moulding compositions consisting essentially of:

(1) from 60 to 93 parts, by weight, preferably from 80 to 90 parts, by weight, of a polyamide;

(2) from 6 to 30 parts, by weight, preferably from 8 to 20 parts, by weight, of a polyethylene; and (3) from 1 to 20 parts, by weight, preferably from 2 to 10 parts, by weight of a copolymer consisting of from (a) 30–85 parts by weight of at least one aromatic vinyl compound having from 8 to 10 carbon atoms, from (c) 1–20 parts by weight of an $\alpha,\beta$-unsaturated mono- and/or di-carboxylic acid or an anhydride thereof, free acid groups optionally being neutralised by mono- and/or polyamines, by ammonia, and from 14.9–50 parts by weight of an ester of the above-mentioned mono- and/or di-carboxylic acid, the sum of the components 1, 2 and 3 amounting to 100 parts by weight, and the sum of (a)–(c) being always 100 parts by weight.

In the context of the present invention, polyamides are linear polycondensates of lactams having from 6 to 12 carbon atoms and standard polycondensates of diamines and dicarboxylic acids, such as 6,6-; 6,8-; 6,9-; 6,10-; 6,12-; 8,8-; and 12,12-polyamide, or polycondensates of aromatic dicarboxylic acids, such as isophthalic acid and terephthalic acid, with diamines, such as hexamethylene diamines, octamethylene diamine, or araliphatic starting compounds, such as m- and p-xylylene diamines and adipic acid, suberic acid, sebacic acid, polycondensates based on alicyclic starting compounds, such as cyclohexane dicarboxylic acid, cyclohexane diacetic acid, 4,4'-diaminodicyclohexyl methane, isophorone diamine.

It is also possible to use mixtures of the above-mentioned polyamides or copolyamides obtainable from the above-mentioned monomers.

It is preferred to use aliphatic polyamides, especially polyamide-6 and polyamide-6.6.

The polyethylene component is preferably a polyethylene having a melt index of > 10 g/10 mins (as measured at 190° C), more especially a polyethylene having a melt index of from 15 to 25 g/10 mins, as measured in accordance with DIN 53 735.

The third component, which improves the compatibility between the polyamide and the polyethylene, is a copolymer produced by conventional processes and consisting of an aromatic vinyl compound, such as styrene, α-methyl styrene, an α,β-unsaturated monocarboxylic acid having from 3 to 6 carbon atoms, such as (methy)acrylic acid, crotonic acid, itaconic acid and/or a dicarboxylic acid having at least 4 carbon atoms, such as maleic acid, fumaric acid, and an aliphatic ester of the above-mentioned mono- or di-carboxylic acids having from 1 to 8 carbon atoms in the alcohol component, such as the metyl, ethyl, propyl, i-propyl, butyl, i-butyl, i-octyl esters of the above-mentioned mono- or di-carboxylic acids. For the neutralisation of the carboxylic groups of the copolymer 3) ammonia or aliphatic mono- or polyamines, preferably diamines, with $C_1-C_6$ are use such as methyl-, ethyl-, isopropyl-amine, diethyl-, diisopropyl-amine, ethyl- or hexamethylen-diamine.

As the third component, it is preferred to use a copolymer of:
 (a) from 30 to 85 parts, by weight, preferably from 40 to 79 parts, by weight, of styrene;
 (b) from 14.9 to 50 parts, by weight, preferably from 20 to 50 parts, by weight, of an ester of an α,β-unsaturated monocarboxylic acid, or of a mono- or di-ester of a dicarboxylic acid preferably having from 1 to 8 carbon atoms in the alcohol component; and
 (c) from 1 to 20 parts, by weight, preferably from 5 to 15 parts, by weight, of an α, β-unsaturated mono- or dicarboxylic acid;
the sum total of the components amounting to 100 parts, by weight.

Particularly preferred copolymers are styrene copolymers which are soluble in organic solvents, such as acetone and ethyl acetate, and which consist of:
 (a) from 40 to 79 parts, by weight, of styrene;
 (b) from 40 to 20 parts, by weight, of (meth)acrylic acid n-butyl ester, and
 (c) from 20 to 1 parts, by weight, of (meth)acrylic acid; the acid groups optionally being neutralised and the sum total of components (a) to (c) amounting to 100 parts, by weight.

Preferably the copolymers have intrinsic viscosities of from 0.1 to 1.6 dl/g, preferably from 0.6 to 1.2 dl/g, as measured at 25° C in tetrahydrofuran. Their acid numbers are in the range of from 66 to 125 mg/g KOH, preferably in the range of from 85 to 117 mg/g KOH. They have a glass transition temperature in the range of from 40° to 80° C.

The starting components are mixed at a temperature above the melting point of the polyamide used, advantageously at temperatures in the range of from 200° to 320° C and more especially at temperatures in the range of from 260° to 290° C.

Machines in which the moulding compositions according to the present invention may be produced are conventional screw machines, i.e. both machines having single screws and also machines having twin screws. It is preferred to use twin-screw extruders.

However, it is also possible to use other mixing machines of the type which are suitable for plasticising plastics.

In addition to the polyolefin components and the copolymers, stabilisers, mould-release agents, lubricants, crystallisation accelerators, plasticisers, pigments, dyes or fillers, such as glass fibres or asbestos, may also be worked into the thermoplastic moulding compositions.

According to the present invention it is possible to produce polymer blends in which the basically incompatible main components of the mixture are present in particularly fine distribution by virtue of the outstanding emulsifying effect of the third component.

Monofils and other mouldings produced from polymer blends of this type do not show any signs of white fracture when broken or cut, or any signs of disintegration. In addition, they have an extremely good surface quality by comparison with mouldings of known polyamide-polyolefin mixtures. They also have a reduced water absorption capacity and reduced solubility or swellability in conventional solvents by comparison with mouldings based on polyamides, and also show greatly increased impact strength when dry in dependence upon the concentration of the polyolefin component. The moulding compositions are suitable for extrusion and injection moulding for the production of mouldings and shaped articles, such as housings, panels, sheets, filaments, tapes and tubes.

EXAMPLE 1

88 parts, by weight, of a polyamide-6 having a relative viscosity of 3.0, as measured on a 1% solution in m-cresol at 25° C in an Ubbelohde viscosimeter, and having a notched impact strength of 3–4 $KH/m^2$ as determined in accordance with DIN 53453, 10 parts, by weight, of a polyethylene having a melt index of from 15 to 25 g/10 minutes and 2 parts, by weight, of a copolymer of 59% of styrene, 29% of n-butyl acrylate, 12% of acrylic acid (intrinsic viscosity in tetrahydrofurane: approx. 1.0, acid number: 94) are mixed for 5 minutes in a mixer. The mixture of components thus prepared is kneaded and extruded in a twin-screw extruder of the ZSK 53 type at 90 rpm/260° C, the melt obtained is spun into a water bath, granulated and then dried in vacuo at 80° C to a water content of 0.05%, by weight. Based on its polyamide component, the product has a relative viscosity of 3.2, as measured on a 1% solution in m-cresol at 25° C in an Ubbelohde viscosimeter.

Freshly injected test specimens show a high level of homogeneity in alternating bending tests, and have a notched impact strength of 12 $KJ/m^2$ as measured in accordance with DIN 53 453.

EXAMPLES 2 TO 11

Further examples along with four Comparison Examples based on the procedure described in Example 1 are summarised in the following Table. In each case, the polyethylene was used in a quantity of 10 parts, by weight, the quantities in which the polyamide and the third component were used making up the balance to 100 parts, by weight.

| Example No. | Characteristic of the 3rd component | | | Neutral-isation with | Quantity [parts, by weight] of the 3rd component | Homo-geneity | Notched impact stren-gth [KJ/m$^2$] |
|---|---|---|---|---|---|---|---|
| | Styrene [%] | n-butyl acrylate [%] | acrylic acid [%] | | | | |
| 2 | 60 | 38 | 2 | — | 3 | good | 9.5 |
| 3 | 59 | 36 | 5 | — | 3 | good | 8.9 |
| 4 | 59 | 36 | 5 | NH$_3$ | 3 | very good | 8.6 |
| 5 | 59 | 36 | 5 | ethylene diamine | 3 | good | 8.7 |
| 6 | 58 | 30 | 12 | — | 3 | very good | 12.1 |
| 7 | 58 | 30 | 12 | NH$_3$ | 3 | good | 9.8 |
| 8 | 59 | 36 | 5 | — | 5 | good | 9.5 |
| 9 | 59 | 36 | 5 | NH$_3$ | 5 | good | 9.2 |
| 10 | 58 | 30 | 12 | — | 10 | very good | 12.5 |
| 11 | 58 | 30 | 12 | NH$_3$ | 10 | good | 10.6 |
| A$^{(x)}$ | 60 | 40 | — | — | 3 | very poor | 4.9 |
| B$^{(x)}$ | 60 | 40 | — | — | 10 | " | 6.1 |
| D$^{(x)}$ | 59 | 36 | 5 | Na | 3 | satisfactory | 8.2 |
| C$^{(x)(xx)}$ | 58 | 30 | 12 | — | 10 | very good | 3.5 |

(x) = Comparison Examples
(xx) = without polyethylene

EXAMPLE 12

In contrast to Example 1, a polyamide-6 having a relative viscosity of 4.0, measured as in Example 1, is used for this Example. The components mixed in the same way as described in Example 1 are extruded at 290° C. The product has a relative viscosity of approximately 4.2, determined in accordance with Example 1. Freshly injected test specimens show excellent homogeneity in alternating bending tests and have a notched impact strength of 22 KJ/m$^2$ (DIN 53 453).

EXAMPLES 13 TO 14

In contrast to Example 1, the same test mixture is kneaded and extruded in a single screw extruder of the ZSK 32 type at 90 rpm, 120 rpm and 150 rpm.

The products obtained have a relative viscosity of 3.1, as determined in accordance with Example 1, show good homogeneity in alternating bending tests and have notched impact strengths of 11 to 12 KJ/m$^2$, as measured in accordance with DIN 53 453.

EXAMPLE 15

88 parts, by weight, of a polyamide-6,6 having a relative viscosity of 2.9, as measured in accordance with Example 1, are processed as in Example 1 with 10% of a polyethylene having a melt index of from 15 to 25 g/10 mins and 2 parts, by weight, of a copolymer of 59% of styrene, 29% of n-butyl acrylate and 12% of acrylic acid (intrinsic viscosity in THF: approximately 1.0).

The product has a relative viscosity of 3.0, as determined in accordance with Example 1, shows good homogeneity in alternating bending tests and has a notched impact strength of 9.6 KJ/m$^2$ as measured in accordance with DIN 53 453.

What we claim is:

1. A moulding composition consisting essentially of:
   (1) from 60 to 93 parts, by weight, of a polyamide;
   (2) from 6 to 30 parts, by weight, of a polyethylene; and
   (3) from to 20 parts, by weight, of a copolymer of an aromatic vinyl compound, an $\alpha,\beta$-unsaturated mono- and/or di-carboxylic acid or an anhydride thereof, free acid groups optionally being neutralised by a mono- and/or poly-amine or with ammonia, and an ester of the said mono- and or di-carboxylic acid; the total of components (1), (2) and (3) amounting to 100 parts, by weight.

2. A composition as claimed in claim 1 which consists essentially of:
   from 80 to 90 Parts, by weight, of component (1);
   from 8 to 20 parts, by weight, of component (2); and
   from 2 to 10 parts, by weight, of component (3), the total of components (1) to (3) amounting to 100 parts by weight.

3. A composition as claimed in claim 1 in which component (3) comprises a copolymer of from (a) 30–85 parts by weight of a $C_8$–$C_{10}$ aromatic vinyl compound, from (c) 1–20 parts by weight of an $\alpha,\beta$-unsaturated mono- and/or di-carboxylic acid or an anhydride thereof and from 14.9–50 parts by weight of an ester of the said mono- and/or di-carboxylic acid, the total of the component, being 100 parts by weight.

4. A composition as claimed in claim 1 in which component (3) consists of:
   (a) from 30 to 85 parts, by weight, of styrene;
   (b) from 14.9 to 50 parts, by weight, of an ester of an $\alpha,\beta$-unsaturated mono- and/or di-carboxylic acid; and
   (c) from 1 to 20 parts, by weight, of an $\alpha,\beta$-unsaturated mono- and/or di-carboxylic acid; the total of component (a) to (c) being 100 parts, by weight.

5. A composition as claimed in claim 4 in which component (3) consists of:
   from 40 to 79 parts, by weight, of component (a);
   from 20 to 50 parts, by weight, of component (b); and
   from 5 to 15 parts, by weight, of component (b).

6. A composition as claimed in claim 4 in which the ester of component (b) contains from 1 to 8 carbon atoms in the alcohol portion.

7. A composition as claimed in claim 1 in which component (3) comprises:
   (a) from 40 to 79 parts, by weight, of styrene;
   (b) from 40 to 20 parts, by weight, of (meth)acrylic acid n-butyl ester; and
   (c) from 20 to 1 parts, by weight, of (meth)acrylic acid, the total of the components a to b, being 100 parts by weight.

8. A composition as claimed in claim 1 in which component (3) has an intrinsic viscosity, as measured at 25° C in tetrahydrofurane, of from 0.1 to 1.6 dl/g.

9. A composition as claimed in claim 8 in which the intrinsic viscosity is from 0.6 to 1.2 dl/g.

10. A composition as claimed in claim 1 in which component (3) has an acid number of from 66 to 125 mg/g KOH.

11. A composition as claimed in claim 10 in which the acid number is from 85 to 117 mg/g KOH.

12. A composition as claimed in claim 1 in which component (3) has a glass transition temperature of from 40° to 80° C.

13. A composition as claimed in claim 1 in which component (1) is polyamide-6 or polyamide-6,6.

14. A composition as claimed in claim 1 in which component (2) is a polyethylene having a melt index of > 10g/10 mins (as measured at 190° C.).

* * * * *